United States Patent [19]
Yamada

[11] Patent Number: 6,140,988
[45] Date of Patent: Oct. 31, 2000

[54] COLOR FILTER AND LIQUID CRYSTAL DISPLAY APPARATUS

[75] Inventor: Nobuaki Yamada, Higashiosaka, Japan

[73] Assignee: Sharp Kabushiki Kaisha, Osaka, Japan

[21] Appl. No.: 09/085,000

[22] Filed: May 28, 1998

[30] Foreign Application Priority Data

May 30, 1997 [JP] Japan .................................. 9-142660

[51] Int. Cl.$^7$ .................................................. G09G 3/36
[52] U.S. Cl. .................. 345/88; 345/87; 345/60; 349/44; 349/42; 349/78; 349/80; 349/96; 349/106; 349/110; 349/148; 349/156
[58] Field of Search ................................ 345/88, 87, 60; 349/44, 42, 78, 80, 96, 106, 110, 148, 156

[56] References Cited

U.S. PATENT DOCUMENTS

| | | | |
|---|---|---|---|
| 3,978,580 | 9/1976 | Leupp et al. | 29/592 |
| 4,964,702 | 10/1990 | Sugimoto et al. | 350/339 |
| 5,117,224 | 5/1992 | Kawamura et al. | 340/703 |
| 5,495,354 | 2/1996 | Jo | 359/67 |
| 5,629,716 | 5/1997 | Okamoto et al. | 345/60 |
| 5,696,569 | 12/1997 | Bongaerts et al. | 349/143 |
| 5,828,434 | 10/1998 | Koden et al. | 349/148 |
| 5,880,803 | 3/1999 | Tamaii et al. | 349/156 |
| 5,907,377 | 5/1999 | Nishida et al. | 349/106 |
| 5,962,983 | 10/1999 | Anderson et al. | 315/169.4 |

FOREIGN PATENT DOCUMENTS 4-178628  6/1992  Japan .

Primary Examiner—Richard A. Hjerpe
Assistant Examiner—Kevin M. Nguyen
Attorney, Agent, or Firm—Nixon & Vanderhye P.C.

[57] ABSTRACT

A color filter includes a lattice-shaped black mask made of each beam in row and column directions on a substrate, a coloring layer being disposed in each display region defined by the lattice-shaped black mask, wherein a height of each beam in the row direction of the black mask is different from a height of each beam in the column direction.

7 Claims, 10 Drawing Sheets

PRIOR ART

FIG.14

PRIOR ART

FIG. 15

PRIOR ART

FIG. 16A

PRIOR ART

FIG. 16B

PRIOR ART

FIG. 17A

PRIOR ART

FIG. 17B

PRIOR ART

FIG. 18A

PRIOR ART

FIG. 18B

PRIOR ART

COLOR FILTER AND LIQUID CRYSTAL DISPLAY APPARATUS

BACKGROUND OF THE INVENTION

1. Field of the Invention

The present invention relates to a color filter used for a liquid crystal display apparatus, and a liquid crystal display apparatus including the color filter.

2. Description of the Related Art

The Applicant of the present invention has previously filed an application for the invention titled "Liquid Crystal Apparatus" (Japanese Patent Application No. 8-341591).

The above-mentioned invention relates to a liquid crystal display apparatus with a high contrast and outstanding viewing angle characteristics in which a liquid crystal layer is interposed between a pair of substrates, a color filter is provided on one substrate, and a homeotropic alignment film is formed on the surface of a black mask of the color filter.

Figure 13:
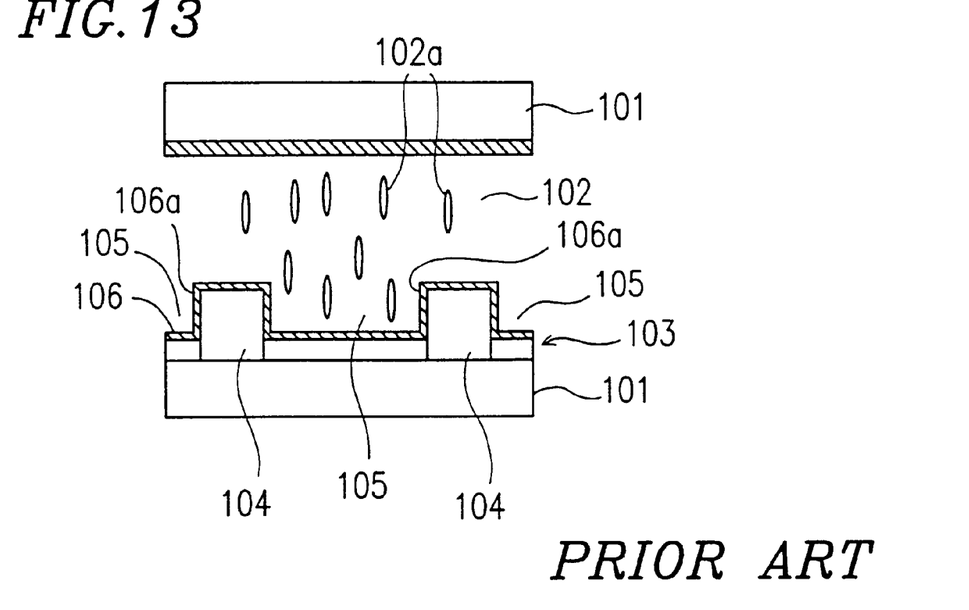
FIG. 13 is a cross-sectional view of a conventional liquid crystal display apparatus.

FIG. 13 is a schematic cross-sectional view of the liquid crystal display apparatus. As shown in this figure, a liquid crystal layer 102 is interposed between a pair of substrates 101. A color filter 103 is provided on the lower substrate 101. A display surface is partitioned by a black mask 104 of the color filter 103, whereby each display region 105 is formed. An alignment film 106 is formed on the color filter 103, and a homeotropic alignment film 106a is formed on each surface of vertical walls of the black mask 104 of the color filter 103.

In a case where the homeotropic alignment film 106a is formed on each surface of the vertical walls of the black mask 104, since a liquid crystal material containing liquid crystal molecules 102a having negative $\Delta\epsilon$ (anisotropy of dielectric constant) is used, liquid crystal molecules 102a in the liquid crystal layer 102 are aligned in a vertical direction to the substrates 101 while a voltage is not applied across the substrates 101, and the liquid crystal molecules 102a of the liquid crystal layer 102 are tilted from the vertical direction while a voltage is applied across the substrates 101.

Figure 14:
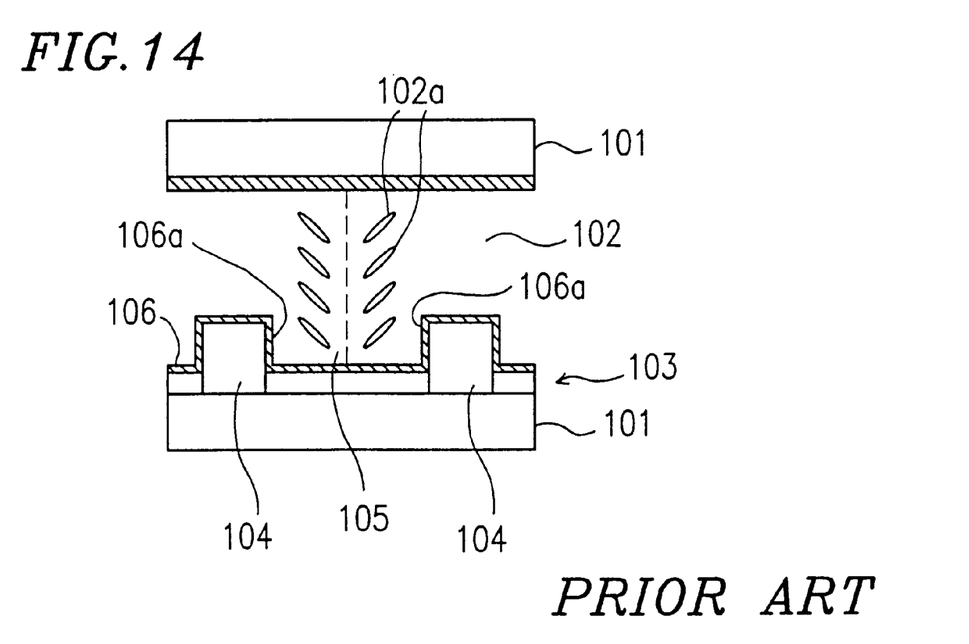
FIG. 14 is a cross-sectional view showing a function of the liquid crystal display apparatus shown in FIG. 13.

In this case, since each homeotropic alignment film 106a is present on either side of each display region 105 as shown in FIG. 14, each liquid crystal molecule 102a is tilted to be aligned so as to be axially symmetric. Thus, a liquid crystal display apparatus with a high contrast and outstanding viewing angle characteristics is obtained.

Even in a case where each liquid crystal molecule 102a is aligned so as to be axially symmetric in each display region 105 by forming the homeotropic alignment film 106a on the black mask 104, if beads with a small diameter are dispersed between the substrates 101 so as to keep a gap therebetween, the alignment of the liquid crystal molecules 102a is disturbed by the beads. As a result, the display surface becomes rough due to the shift of an axis position.

Figure 15:
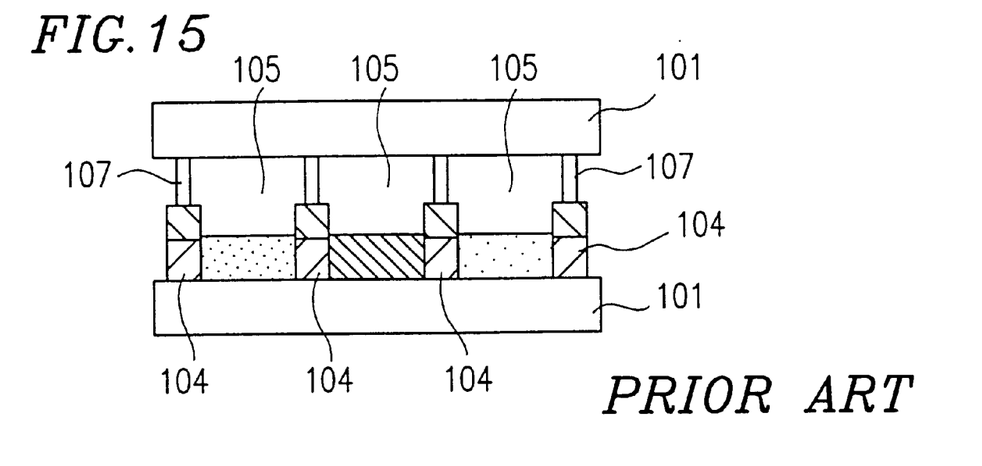
FIG. 15 is a cross-sectional view of another conventional liquid crystal display apparatus.

In order to solve the above-mentioned problem, each spacer 107 is arranged only on the black mask 104 as shown in FIG. 15, thereby preventing the spacers 107 from affecting the liquid crystal molecules 102a in each display region 105.

A method for producing the above-mentioned structure will be described below.

Figure 16A:
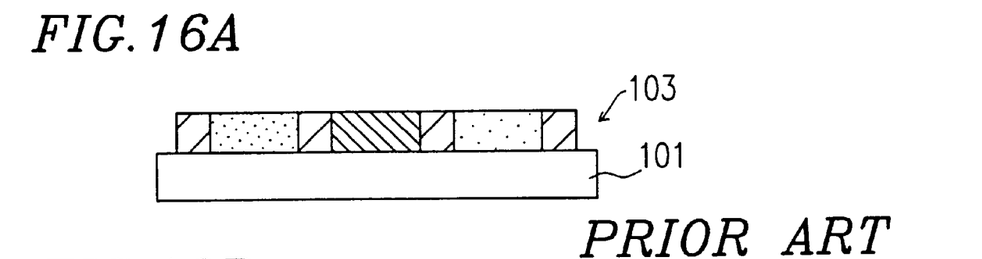
FIG. 16A is a cross-sectional view of the color filter.
Figure 16B:
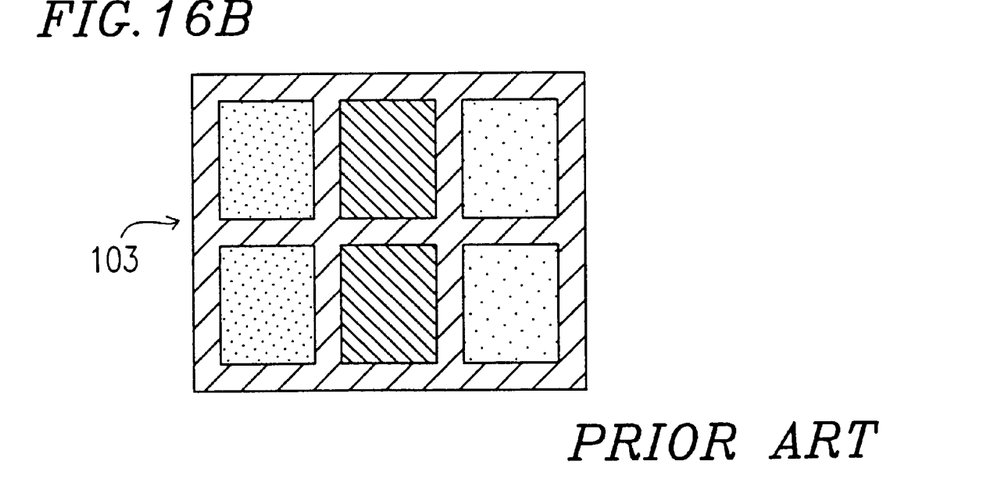
FIG. 16B is a plan view of the color filter.
Figure 17A:
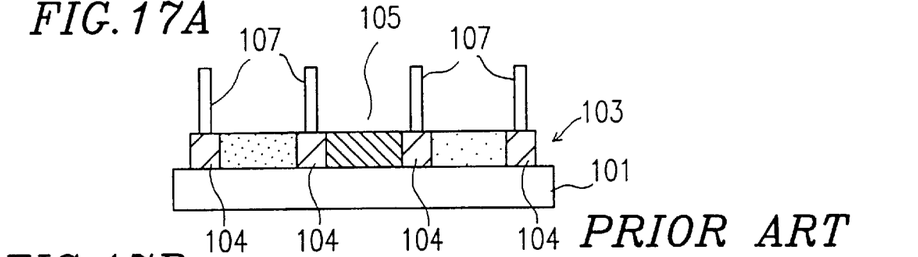
FIG. 17A is a cross-sectional view.
Figure 17B:
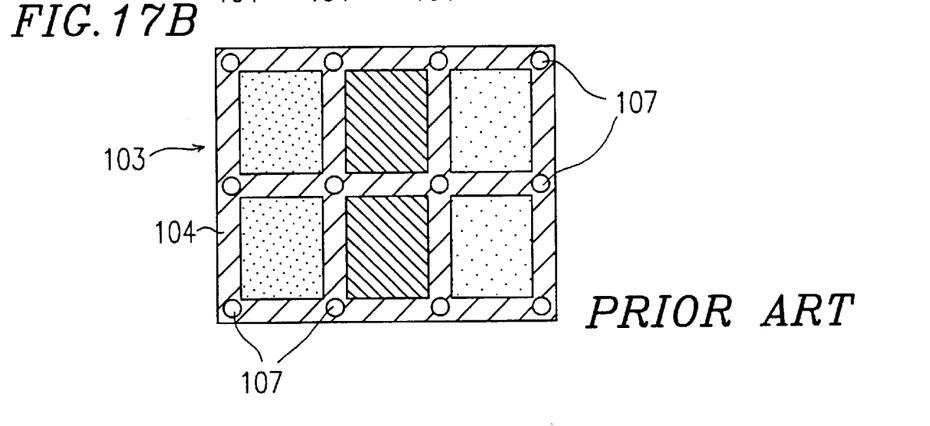
FIG. 17B is a plan view.
Figure 18A:
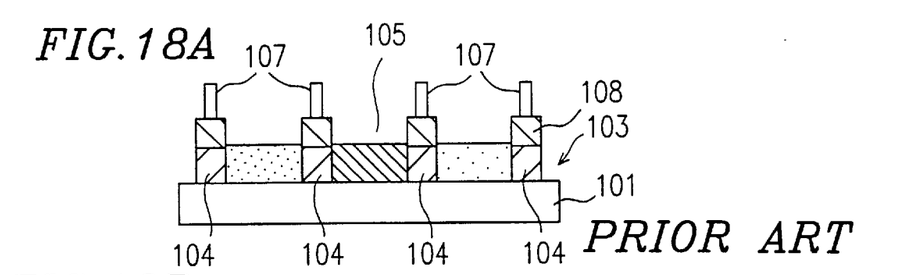
FIG. 18A is a cross-sectional view.
Figure 18B:
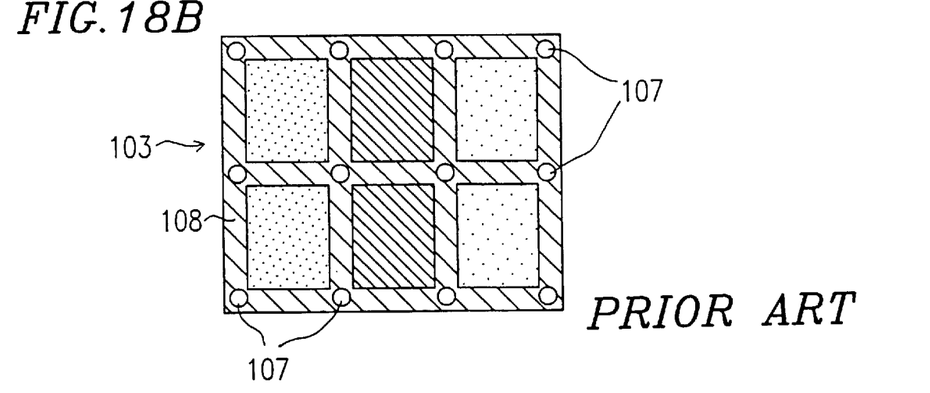
FIG. 18B is a plan view.

As shown in FIGS. 16A and 16B, the color filter 103 is formed on one of the substrates 101. Then, as shown in FIGS. 17A and 17B, each spacer 107 is arranged on the black mask 104 of the color filter 103. Each spacer 107 is fixed by a lattice-shaped wall 108 as shown in FIGS. 18A and 18B. The other substrate 101 is placed as shown in FIG. 15.

FIGS. 16A, 17A, and 18A are cross-sectional views, and FIGS. 16B, 17B, and 18B are plan views.

According to the above-mentioned method, it is difficult to place each spacer 107 only on the black mask 104 (not on each display region 105) as shown in FIG. 15. This complicates the production process, resulting in an increase in cost.

SUMMARY OF THE INVENTION

A color filter of the present invention includes a lattice-shaped black mask made of each beam in row and column directions on a substrate, a coloring layer being disposed in each display region defined by the lattice-shaped black mask, wherein a height of each beam in the row direction of the black mask is different from a height of each beam in the column direction.

A liquid crystal display apparatus of the present invention includes a liquid crystal layer interposed between a pair of substrates, the liquid crystal layer being partitioned into a plurality of display regions, an image being displayed in each of the display regions by applying a voltage from each of the substrates to the display region, wherein the color filter of claim 1 is formed on one of the substrates so as to be interposed between the substrates.

In one embodiment of the present invention, a homeotropic alignment film is provided on a surface of the black mask of the color filter.

In another embodiment of the present invention, liquid crystal molecules in the liquid crystal layer are aligned in a vertical direction to the substrates while a voltage is not being applied from each of the substrates to the display region, and the liquid crystal molecules in the liquid crystal layer are aligned so as to be axially symmetric while a voltage is being applied from each of the substrates to the display region.

In another embodiment of the present invention, signal electrodes and scanning electrodes are provided on one of the substrates so as to cross each other, each switching element is placed at each crossing portion of the signal electrodes and the scanning electrodes, each display region is defined by the signal electrodes and the scanning electrodes, each pixel electrode is provided in each of the display regions, and each of the pixel electrodes is driven by each of the switching elements.

In another embodiment of the present invention, each groove-shaped plasma channel is provided on one of the substrates, each band-shaped signal electrode is provided on the other of the substrates, the substrates are placed with a liquid crystal layer interposed therebetween in such a manner that the plasma channels and the signal electrodes cross each other, and each plasma channel is selectively discharged and each signal is applied to each of the signal electrodes, whereby each voltage is applied to each of the display regions at crossing portions of the plasma channels and the signal electrodes.

According to the above-mentioned structure, since the color filter is interposed between the substrates, a gap therebetween is determined by the thickest portion of the color filter (i.e., either each bar in the row direction of the black mask or each bar in the column direction, which is higher). Therefore, spacers such as beads with a small diameter are not required, and the alignment of liquid crystal molecules in each display region is not disturbed.

Furthermore, liquid crystal flows over each lower bar (i.e., liquid crystal flows in a direction orthogonal to each lower bar), so that liquid crystal can be easily injected between the substrates.

The homeotropic alignment film may be provided on the black mask of the color filter. In this case, the liquid crystal molecules in each display region are aligned so as to be axially symmetric, and the alignment of the liquid crystal molecules in each display region is not disturbed. Therefore, a liquid crystal display apparatus with a high contrast and outstanding viewing angle characteristics can be obtained.

Furthermore, in a case where the homeotropic alignment film is provided on the surface of the black mask, the liquid crystal molecules in the liquid crystal layer are aligned in a vertical direction to the substrates when a voltage is not applied from each substrate to each display region, and the liquid crystal molecules in the liquid crystal layer are aligned so as to be axially symmetric when a voltage is applied from each substrate to each display region.

Thus, the invention described herein makes possible the advantages of (1) providing a color filter which is capable of keeping a gap between substrates without dispersing spacers and does not disturb the alignment of liquid crystal molecules in each display region; and (2) a liquid crystal display apparatus to which the color filter is applied.

These and other advantages of the present invention will become apparent to those skilled in the art upon reading and understanding the following detailed description with reference to the accompanying figures.

BRIEF DESCRIPTION OF THE DRAWINGS

FIGS. 3A and 3B show the steps of forming a black mask of the color filter shown in FIG. 1.

FIGS. 4A and 4B show the steps of forming a coloring layer of the color filter shown in FIG. 1.

FIGS. 5A and 5B show the steps of forming an overcoat layer of the color filter shown in FIG. 1.

FIGS. 6A and 6B show the steps of grinding the black mask of the color filter shown in FIG. 1.

FIGS. 7A and 7B show the steps of forming an alignment film of the color filter shown in FIG. 1.

FIGS. 8A and 8B show one embodiment of a liquid crystal display apparatus according to the present invention.

FIGS. 16A and 16B show the steps of forming a color filter of the liquid crystal display apparatus shown in FIG. 15.

FIGS. 17A and 17B show the steps of arranging each spacer on a black mask of the color filter of the liquid crystal display apparatus shown in FIG. 15.

FIGS. 18A and 18B show the steps of forming a lattice-shaped wall of the liquid crystal display apparatus shown in FIG. 15.

DESCRIPTION OF THE PREFERRED EMBODIMENTS

The present invention will be described by way of illustrative embodiments with reference to the drawings.

Figure 1:
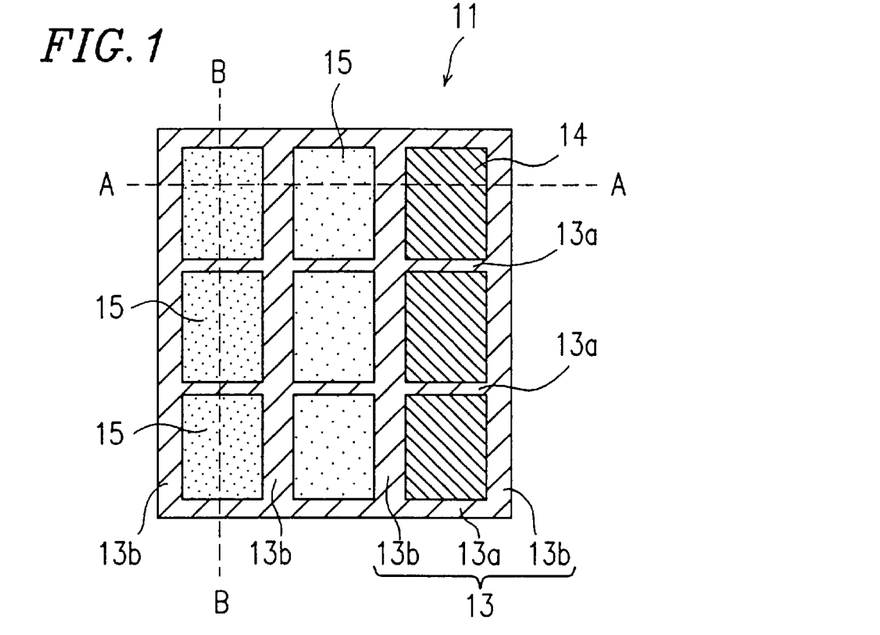
FIG. 1 is a plan view showing one embodiment of a color filter according to the present invention.
Figure 2A:
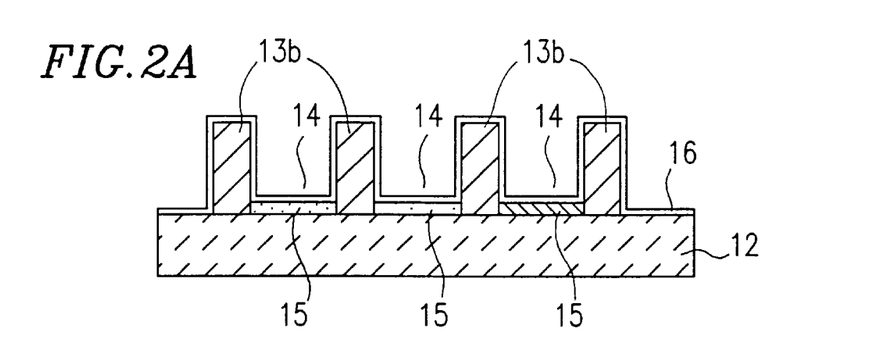
FIG. 2A is a cross-sectional view taken along a line A—A of FIG. 1.
Figure 2B:
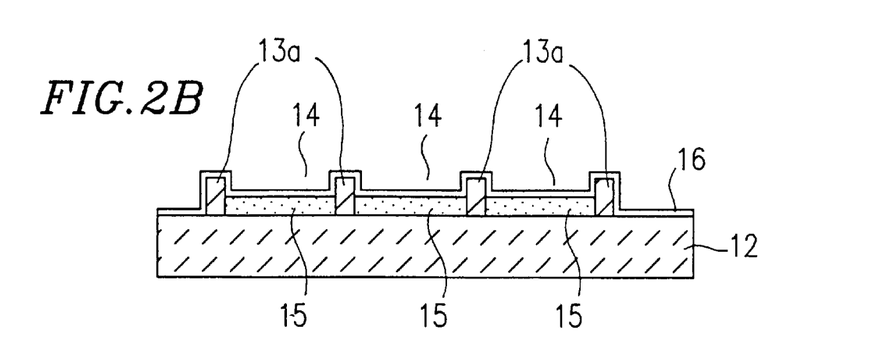
FIG. 2B is a cross-sectional view taken along a line B—B of FIG. 1.

FIG. 1 shows one embodiment of a color filter according to the present invention. FIG. 2A is a cross-sectional view taken along a line A—A of FIG. 1, and FIG. 2B is a cross-sectional view taken along a line B—B.

As is apparent from these figures, a color filter 11 of the present embodiment has a structure in which a lattice-shaped black mask 13 is formed on a substrate 12, each coloring layer 15 is arranged in each display region 14 defined by the lattice of the black mask 13, and an alignment film 16 is formed on the color filter 11 and each coloring layer 15.

The black mask 13 is composed of bars 13a in a row direction and bars 13b in a column direction. The width of each bar 13a in the row direction is smaller than that of each bar 13b in the column direction, and the height of each bar 13a in the row direction is lower than that of each bar 13b in the column direction.

A method for producing the color filter 11 will be described with reference to FIGS. 3A, 3B to 7A, 7B. FIGS. 3A, 4A, 5A, 6A, and 7A are cross-sectional views taken along the row direction in the same way as in FIG. 2A, and FIGS. 3B, 4B, 5B, 6B, and 7B are cross-sectional views taken along the column direction in the same way as in FIG. 2B.

Figure 3A:
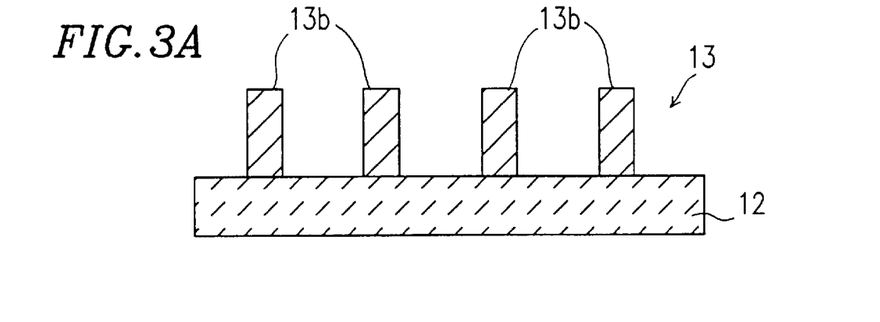
FIG. 3A is a cross-sectional view taken along a row direction of the color filter shown in FIG. 1.
Figure 3B:
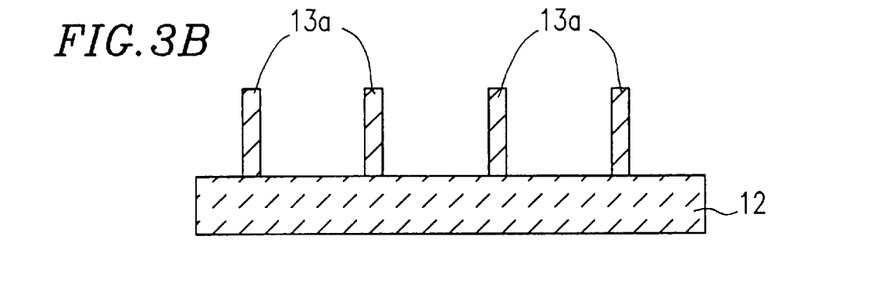
FIG. 3B is a cross-sectional view taken along a column direction of the color filter shown in FIG. 1.

First, a photosensitive light-blocking layer is coated onto the substrate 12 made of transparent glass, plastic, etc., and the light-blocking layer is developed by being exposed to light through a photomask, whereby the black mask 13 as shown in FIGS. 3A and 3B is formed.

In the black mask 13 shown in FIGS. 3A and 3B, the width of each bar 13a in the row direction is smaller than that of each bar 13b, and the height of each bar 13a in the row direction is the same as that of each bar 13b in the column direction.

As the photosensitive light-blocking layer, a photosensitive material having characteristics such as heat resistance and solvent resistance in which a light-blocking pigment is dispersed is used. Examples of the photosensitive material include acrylic resin, polyester resin, and polyimide resin. Examples of the pigment include carbon black and titanium black. More specifically, commercially available photosensitive resin containing a black material ("CFPR-BK55O S" produced by Fujifilm Olin Co., Ltd. or "V259-BKO" produced by Nippon Steel Chemical Co., Ltd.) or the like can be used.

The light-blocking layer is not limited to the above-mentioned material. Any material can be used as long as it is photosensitive and allows patterning to be performed.

Furthermore, as described later, when the above-mentioned color film is applied to a liquid crystal display apparatus, a gap between substrates of the liquid crystal display apparatus is determined by the height of each bar 13b in the column direction of the black mask 13. Therefore, it is required that the light-blocking layer to be the black mask 13 is controlled so as to have a uniform and predetermined thickness. For this purpose, the blocking layer is coated over the entire surface of the substrate 12 so as to have a uniform and predetermined thickness by well-known screen printing, spin coating, roll coating, etc.

In general, since the thickness of each coloring layer 15 is about 1 to 3 $\mu$m, the sum of the thickness of each coloring layer 15 and the thickness of the liquid crystal layer between the substrates of the liquid crystal display apparatus becomes the same as the height of each bar 13b in the column direction of the black mask 13. Thus, the thickness of the light-blocking layer must be predetermined in such a manner that this height is finally obtained after the subsequent respective steps (in particular, a grinding step).

Figure 4A:
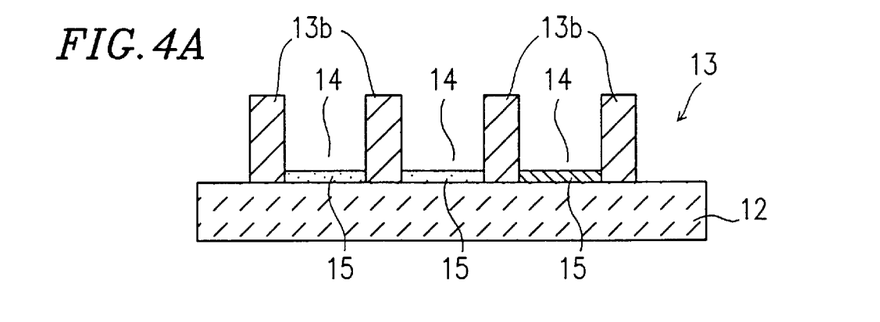
FIG. 4A is a cross-sectional view taken along a row direction of the color filter shown in FIG. 1.
Figure 4B:
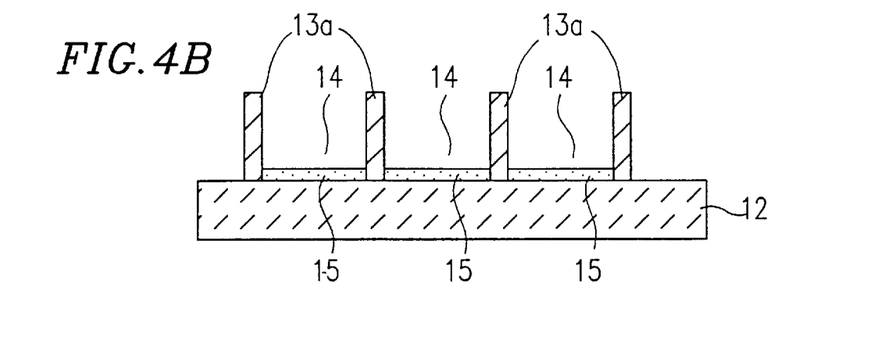
FIG. 4B is a cross-sectional view taken along a column direction of the color filter shown in FIG. 1.

Next, as shown in FIGS. 4A and 4B, each coloring layer 15 is arranged in each display region 14 defined by the lattice of the black mask 13. In order to form these coloring layers 15, a method for transferring a color resist or a color film can be used. As described above, the thickness of each coloring layer 15 is one factor determining the thickness of the liquid crystal layer between the substrates of the liquid crystal display apparatus, so that it is required to control the coloring layers 15 so as to have a uniform and predetermined thickness.

Figure 5A:
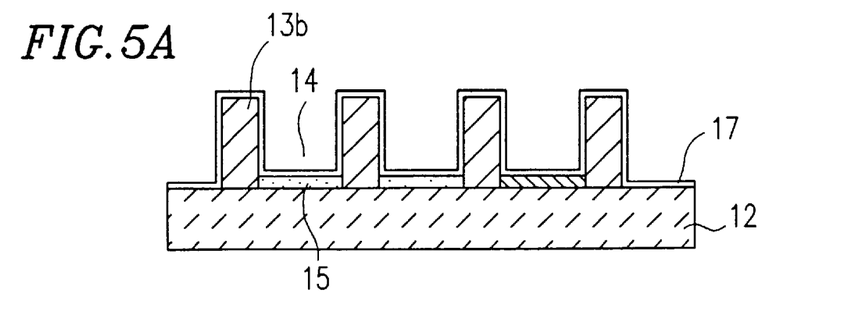
FIG. 5A is a cross-sectional view taken along a row direction of the color filter shown in FIG. 1.
Figure 5B:
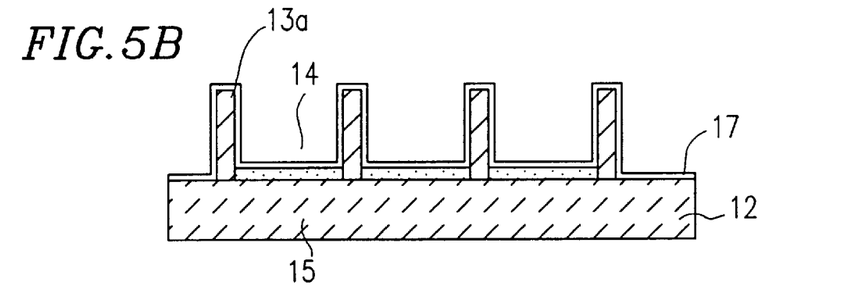
FIG. 5B is a cross-sectional view taken along a column direction of the color filter shown in FIG. 1.

Next, as shown in FIGS. 5A and 5B, an overcoat layer 17 is formed. The overcoat layer 17 may be omitted. However, when the overcoat layer 17 is formed, inner angles of each display region 14 become smooth. In a case where the color filter 11 is applied to an active matrix type liquid crystal display apparatus described later, a transparent counter electrode is formed on the black mask 13. Therefore, if the inner angles of each display region 14 are made smooth by the overcoat layer 17, disconnection of the transparent counter electrode can be prevented. Furthermore, if the inner angles of each display region 14 are made smooth by the overcoat layer 17, liquid crystal molecules in the display regions 14 are likely to be aligned so as to be axially symmetric. Thus, there is an effect that the alignment axis is controlled.

Then, the black mask 13 formed on the substrate 12 is ground. For example, an abrasive is sprayed onto a flat grinding surface, and the substrate 12 is placed on the grinding surface with the black mask 13 disposed therebetween. The substrate 12 is reciprocated, whereby the black mask 13 is ground. In the black mask 13, the width of each bar 13a in the row direction is smaller than that of each bar 13b in the column direction. Therefore, each bar 13a in the row direction is more rapidly ground than each bar 13b in the column direction.

Figure 6A:
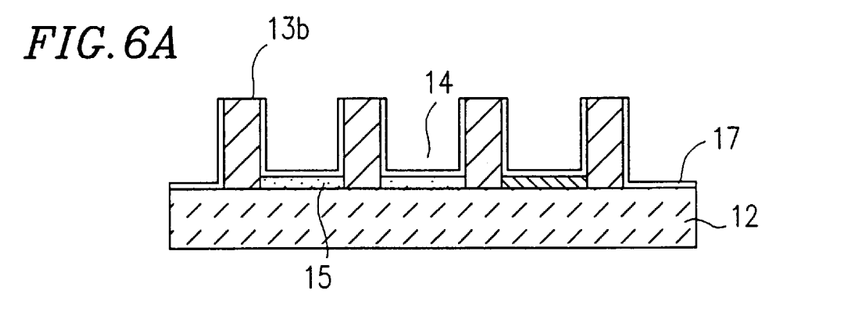
FIG. 6A is a cross-sectional view taken along a row direction of the color filter shown in FIG. 1.
Figure 6B:
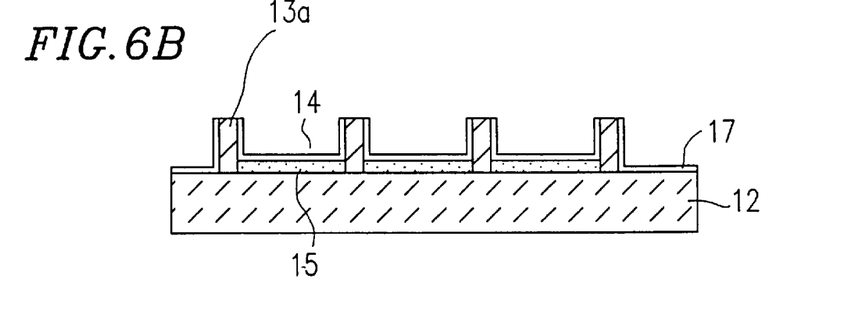
FIG. 6B is a cross-sectional view taken along a column direction of the color filter shown in FIG. 1.

Consequently, as shown in FIGS. 6A and 6B, the height of each bar 13a in the row direction becomes smaller than that of each bar 13b in the column direction. Furthermore, the inside of each display region 14 is slightly ground to have a mortar shape. This allows the liquid crystal molecules in the display regions 14 to be easily aligned so as to be axially symmetric.

In a case where the width of each bar of the black mask 13 is about 30 $\mu$m or less, the grinding speed is likely to increase, and the height of each bar is likely to become lower. Therefore, if the width of each bar 13a in the row direction is prescribed to be about 30 $\mu$m or less, and the width of each bar 13b in the column direction is prescribed to be more than about 30 $\mu$m, the selectivity of grinding becomes higher between each bar 13a in the row direction and each bar 13b in the column direction, whereby the height of each bar 13a in the row direction can be made smaller than that of each bar 13b in the column direction.

Furthermore, when the grinding is finished, it is required that the height of each bar 13b in the column direction of the black mask 13 matches with the sum of the thickness of each coloring layer 15 and the thickness of the liquid crystal layer so that the liquid crystal layer of the liquid crystal display apparatus has a desired thickness.

After the grinding is finished, the color filter 11 is washed, whereby the abrasive is removed.

Next, in a case where the color filter 11 is applied to the active matrix type liquid crystal display apparatus described later, a transparent counter electrode (ITO film, etc.) is formed on the black mask 13.

The reason for forming the counter electrode on the black mask 13 is as follows: when dielectric layers such as each coloring layer 15 and the overcoat layer 17 are placed on the counter electrode, a drive voltage between the counter electrode and each pixel electrode placed opposing the counter electrode with the liquid crystal layer disposed therebetween increases, whereas when the counter electrode is formed on the black mask 13, a drive voltage between the counter electrode and each pixel electrode can be set low.

Furthermore, in a case where the color filter 11 is applied to a plasma address type liquid crystal display apparatus described later, a transparent stripe-shaped counter electrode (ITO film, etc.) is required. Since a thin plate glass is disposed between each plasma channel and the liquid crystal layer, as described later, the influence of the dielectric layers such as each coloring layer 15 and the overcoat layer 17 can be reduced. Thus, the degree of freedom of the arrangement of each coloring layer 15 and the overcoat layer 17 is high.

Figure 7A:
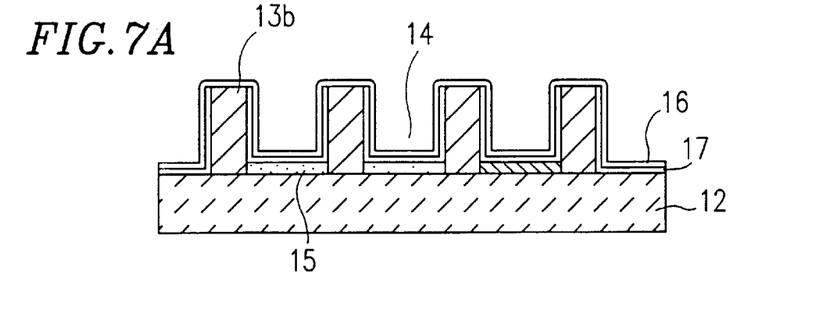
FIG. 7A is a cross-sectional view taken along a row direction of the color filter shown in FIG. 1.
Figure 7B:
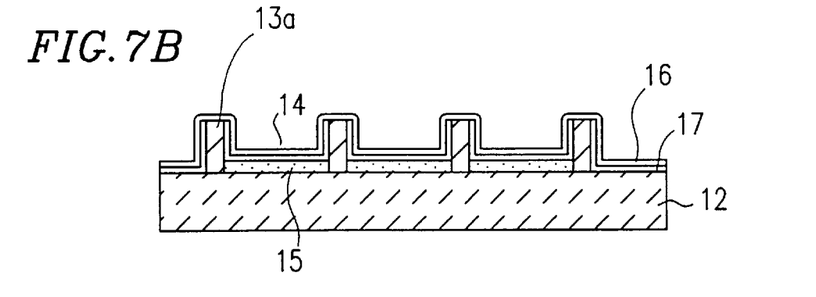
FIG. 7B is a cross-sectional view taken along a column direction of the color filter shown in FIG. 1.

Finally, as shown in FIGS. 7A and 7B, the alignment film 16 is formed so as to cover the black mask 13 and each coloring layer 15 by a well-known method.

Figure 8A:
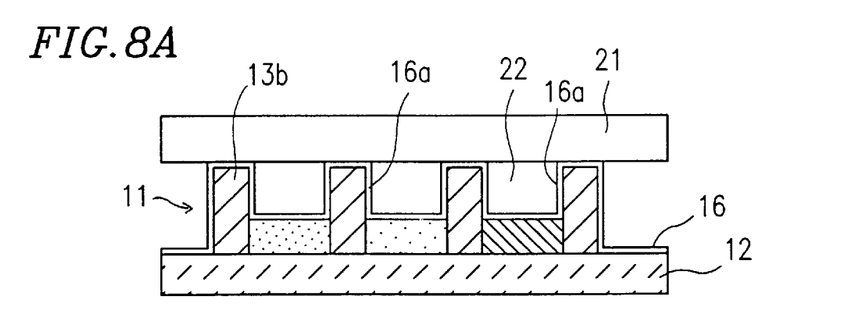
FIG. 8A is a cross-sectional view taken along a row direction.
Figure 8B:
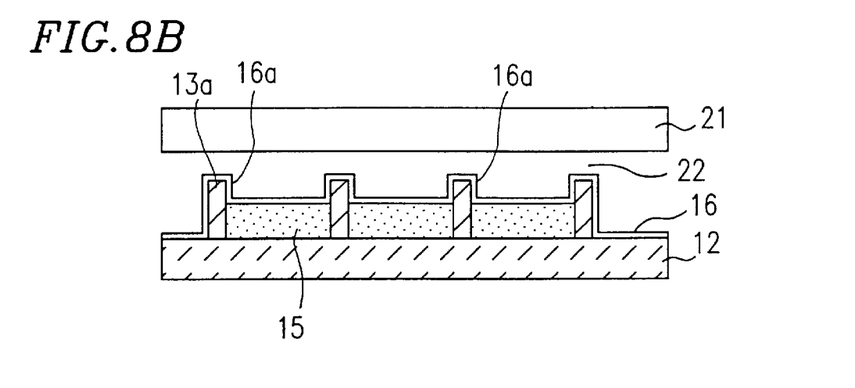
FIG. 8B is a cross-sectional view taken along a column direction.

FIGS. 8A and 8B show one embodiment of a liquid crystal display apparatus to which the color filter 11 shown in FIGS. 1, 2A and 2B is applied. FIG. 8A is a cross-sectional view taken along the row direction in the same way as in FIG. 2A, and FIG. 8B is a cross-sectional view taken along the column direction in the same way as in FIG. 2B.

As is apparent from FIGS. 8A and 8B, an upper substrate 21 is placed on the color filter 11, and a liquid crystal layer 22 is placed between the substrate 21 and the substrate 12.

The height of each bar 13b in the column direction of the black mask 13 is larger than that of each bar 13a in the row direction, so that each bar 13b in the column direction is interposed between the substrates 12 and 21, and a gap between the substrates 12 and 21 matches with the height of each bar 13b in the column direction.

Thus, even though spacers such as beads with a small diameter are dispersed between the substrates 12 and 21 as in the conventional example, a gap between the substrates 12 and 21 can be set without disturbing the alignment of the liquid crystal molecules in each display region 14.

Unlike the structure of the conventional apparatus shown in FIG. 15 in which each spacer 107 is disposed on the black mask 104, and each spacer 107 is fixed by the lattice-shaped wall 108, the liquid crystal display apparatus of the present embodiment has a simple structure in which the color filter 11 is interposed between the substrates 12 and 21, so that it can be easily produced.

Furthermore, liquid crystal flows over each bar 13a in the row direction, (i.e., liquid crystal flows in the column direction), so that liquid crystal can easily be injected between the substrates 12 and 21.

As described above, the Applicant of the present invention has previously filed an application on another invention related to a technique of aligning liquid crystal molecules so as to be axially symmetric in a display region. Before this invention was achieved, the following had been found: a mixture of an n-type ($\Delta\epsilon<0$) liquid crystal material and a light-curable resin is injected into a display region having homeotropic alignment films on both sides; and when a voltage is applied to the display region, liquid crystal molecules are aligned so as to be axially symmetric with respect to a plurality of alignment axes in an initial state; when a voltage is further continued to be applied, liquid crystal molecules are aligned so as to be axially symmetric with respect to only one alignment axis. Thereafter, the following has been clarified: a light-curable monomer is previously mixed in liquid crystal; when the light-curable monomer is cured by UV irradiation under the application of a voltage to the display region, an alignment regulating element (pretilt) in axially symmetric alignment can be formed; and liquid crystal molecules are aligned with respect to one alignment axis in an initial state of the application of a voltage. Thus, this invention was achieved.

In the liquid crystal display apparatus of the present embodiment, the above-mentioned alignment regulating elements (pretilt) containing a light-curable monomer (i.e., homeotropic alignment films 16a) are formed on both sides of the display region 14, thereby making it possible to rapidly reproduce axially symmetric alignment in the display region 14. Furthermore, as described above, there is no spacer in each display region 14, and alignment of the liquid crystal molecules in the liquid crystal layer 22 is not disturbed. Therefore, in the same way as shown in FIG. 14, liquid crystal molecules are aligned so as to be axially symmetric in the display region 14, and consequently, a liquid crystal display apparatus with a high contrast and outstanding viewing angle characteristics can be obtained.

EXAMPLE

Hereinafter, one example of a color filter according to the present invention will be described. The structure of the color filter of the present example is substantially the same as that of the color filter of the embodiment shown in FIGS. 1 and 2A and 2B. The method for producing the color filter of the present example is substantially the same as shown in FIGS. 3A and 3B to 7A and 7B. Therefore, the color filter of the present example will be described with reference to these figures.

First, a negative resist ("V259-BKO" produced by Nippon Steel Corporation) in which a black pigment is dispersed is coated onto a substrate 12 made of transparent glass or plastic. The negative resist is patterned by general photolithography. Thereafter, the pattern thus formed is sintered to be cured, whereby a black mask 13 as shown in FIGS. 3A and 3B is formed. The width of each bar 13a in a row direction of the black mask 13 is about 20 $\mu$m, the width of each bar 13b in a column direction of the black mask 13 is about 50 $\mu$m, and the thickness of the black mask 13 is about 6 $\mu$m.

Next, each color resist of red, green, and blue is coated onto the black mask 13 so as to have a thickness of about 1.8 $\mu$m. These color resists are patterned by photolithography, and sintered to be cured. Thus, each coloring layer 15 is formed in each display region 14 of the black mask 13 as shown in FIGS. 4A and 4B.

Then, as shown in FIGS. 5A and 5B, an overcoat layer 17 is formed. Thereafter, the black mask 13 formed over the substrate 12 is ground on a grinding surface with an abrasive. As shown in FIGS. 6A and 6B, the height of each bar 13a in the row direction is prescribed to be about 4.2 $\mu$m, and the height of each bar 13b in the column direction is prescribed to be about 5.9 $\mu$m.

The thickness of the black mask 13 is 6 $\mu$m in an initial stage shown in FIGS. 3A and 3B. It is understood that each bar 13a in the row direction is ground by about 1.8 $\mu$m and each bar 13b in the column direction is ground by about 0.1 $\mu$m.

Furthermore, since the height of each bar 13b in the column direction is about 5.9 $\mu$m, and the thickness of each coloring layer 15 is about 1.8 $\mu$m, when the color filter 11 is applied to the liquid crystal display apparatus, the thickness of the liquid crystal layer becomes about 4.1 $\mu$m.

Next, when the color filter 11 is applied to an active matrix type liquid crystal display apparatus described later, a transparent counter electrode (ITO film, etc. ) is formed. When the color filter 11 is applied to a plasma address type liquid crystal display apparatus described later, a transparent stripe-type counter electrode (ITO film, etc.) is formed. Finally, as shown in FIGS. 7A and 7B, a material of an alignment film ("JALS-204" produced by Japan Synthetic Rubber Co., Ltd.) is coated to form an alignment film 16.

Figure 9:
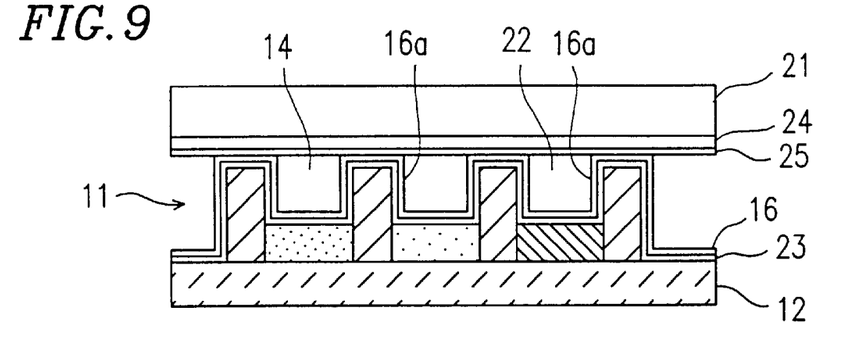
FIG. 9 shows one example of an active matrix type liquid crystal display apparatus according to the present invention.

FIG. 9 schematically shows one example of an active matrix liquid crystal display apparatus to which the color filter 11 of the present example is applied.

In the liquid crystal display apparatus of the present example, an upper substrate 21 is placed on the color filter 11, and a liquid crystal material is injected between the substrates 21 and 12, whereby a liquid crystal layer 22 is formed.

Figure 12:
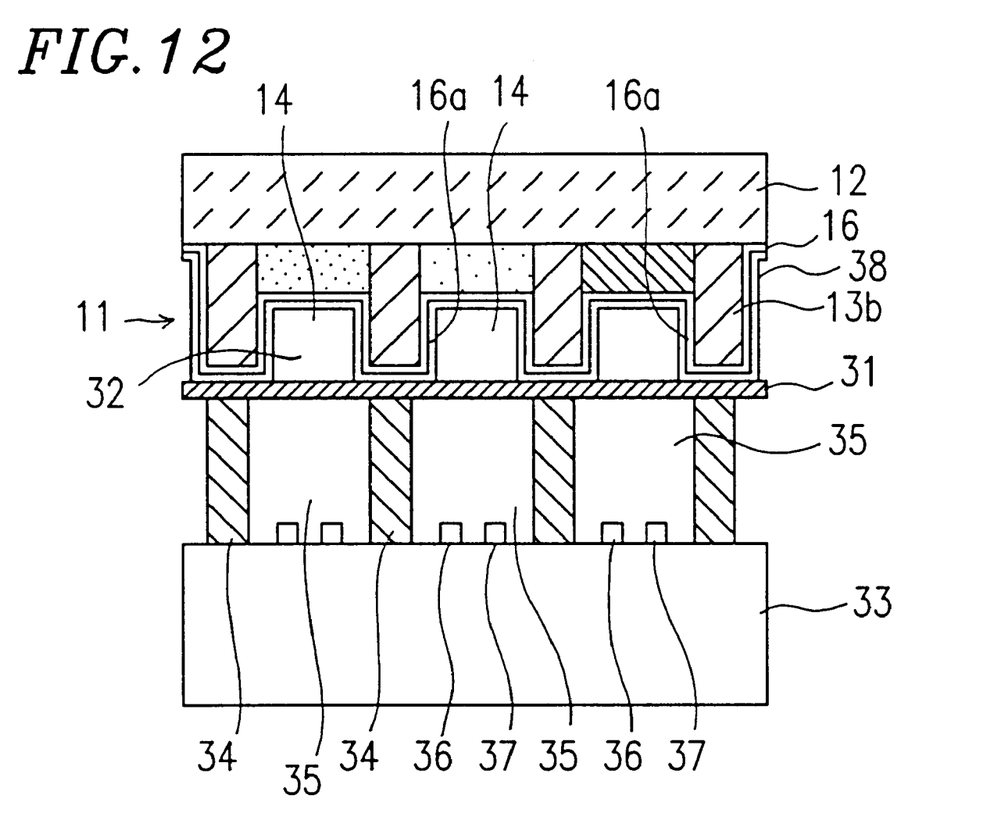
FIG. 12 is a cross-sectional view showing one example of a plasma address type liquid crystal display apparatus according to the present invention.

The liquid crystal material is a mixture in which about 0.3 wt % of a compound A represented by the following chemical formula and about 0.1 wt % of Irgacure 651 are mixed in an n-type liquid crystal material ($\Delta\epsilon=-4.0$, $\Delta n=0.08$, chiral angle 90° at 5 $\mu$m). The liquid crystal material is injected between the substrates 12 and 21. Thereafter, an about 5 volts of voltage is applied across the substrates 12 and 21, whereby liquid crystal molecules are aligned so as to be axially symmetric in each display region 14. Furthermore, the cell is irradiated with UV rays (6 mW/cm$^2$; 365 nm) at a room temperature of about 25° C. for about 10 minutes while a voltage is maintained at about 2.5 volts which is higher than a threshold value by about 0.5 volts. The light-curable monomer in the liquid crystal material is cured, whereby an alignment regulating element (pretilt) in axially symmetric alignment is formed. Accordingly, axially symmetric alignment can be rapidly reproduced in the display region 14.

direction and each bar 13b in the column direction, the width of each bar, the thickness of each coloring layer 14, etc. remaining unchanged.

In the liquid crystal display apparatus of the present example, a thin plate glass 31 is placed on the color filter 11, Since the liquid crystal display apparatus of the present example is of an active matrix type, a transparent counter electrode (ITO film, etc.) 23 and the alignment film 16 are provided on the substrate 12. Furthermore, a drive circuit 24 for driving the liquid crystal in each display region 14 is provided on the substrate 21. More specifically, each signal electrode and each scanning electrode are provided so as to be orthogonal to each other. Each TFT is disposed at each crossed portion of these electrodes, and the display region is partitioned by these electrodes. Each pixel electrode is provided in each display region, and each pixel electrode is driven by each TFT. An alignment film 25 is formed on the drive circuit 24. Since the drive circuit 24 is well-known, its detailed description will be omitted.

In the above-mentioned structure, each display region of the substrate 21 matches with each display region 14 of the color filter 11. When a voltage is respectively applied between each pixel electrode on the substrate 21 and the counter electrode 23 on the substrate 12, liquid crystal is driven in each display region 14.

In the active matrix type liquid crystal display apparatus, axially symmetric alignment of the liquid crystal molecules is rapidly reproduced in each display region 14. Therefore, a state in which the liquid crystal molecules are aligned in a vertical direction to the substrates as shown in FIG. 13 (black state) and a state in which the liquid crystal molecules are aligned in a parallel direction to the substrates as shown in FIG. 14 can be rapidly switched. Thus, a high contrast and outstanding viewing angle characteristics can be exhibited.

Figure 10:
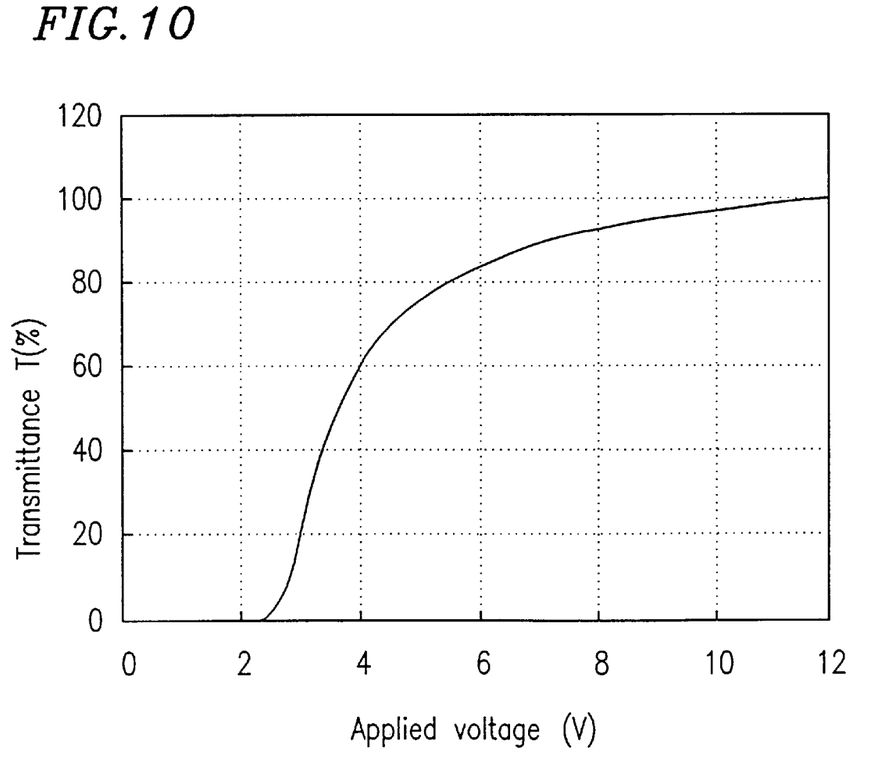
FIG. 10 is a graph showing the relationship between the transmittance and the applied voltage of the liquid crystal display apparatus shown in FIG. 9.

FIG. 10 is a graph showing transmittance characteristics of the liquid crystal display apparatus of the present example. It is also understood from this figure that a high contrast is obtained in the present example.

Figure 11:
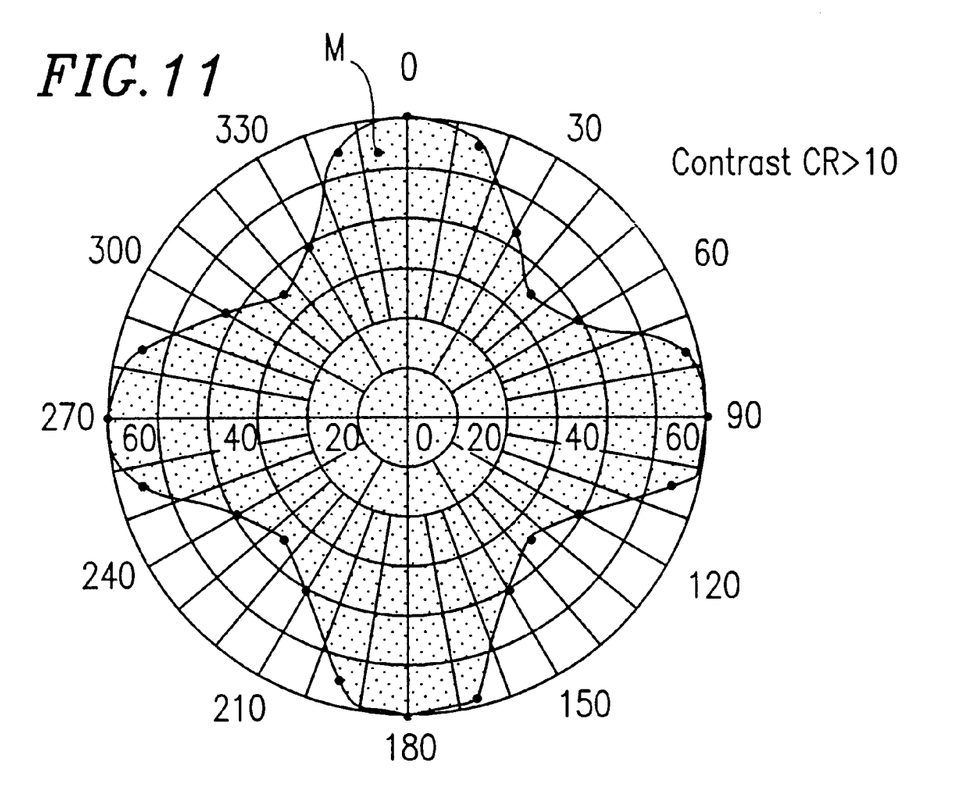
FIG. 11 is a graph showing viewing angle characteristics of the liquid crystal display apparatus shown in FIG. 9.

FIG. 11 is a graph showing viewing angle characteristics. It is understood from this graph that a viewing angle range M in which a sufficient contrast CR (>10) is obtained is large.

As is apparent from the graph shown in FIG. 11, viewing angle characteristics are degraded in the vicinity of a 45° direction from a polarization axis of a polarizing plate of the liquid crystal display. This problem can be solved by inserting a phase difference plate having negative mono-axial anisotropy of refractive index between the liquid crystal cell and the polarizing plate.

FIG. 12 schematically shows one example of a plasma address type liquid crystal display apparatus to which the color filter 11 which is substantially the same as that of the above example is applied.

Here, in the color filter 11, only the height of the black mask 13 is changed from about 6.0 μm to about 8.2 μm, with the difference in height between each bar 13a in the row and a liquid crystal material is injected between the substrate 12 and the thin plate glass 31, whereby a liquid crystal layer 32 is formed.

The liquid crystal material used herein is the same as that used in the active matrix type liquid crystal display apparatus shown in FIG. 9. A light-curable monomer is previously mixed in liquid crystal. The light-curable monomer is cured, whereby homeotropic alignment film 16a is formed on each surface of vertical walls of the black mask 13, allowing the axially symmetric alignment in the display region 14 to be rapidly reproduced.

On the other hand, a substrate 33 includes each partition wall 34, each groove-shaped plasma channel 35 with an ionization gas sealed therein, and each anode electrode 36 and each cathode electrode 37 provided in each plasma channel 35, for ionizing the ionization gas in each plasma channel 35.

Furthermore, each band-shaped transparent electrode 38 for transmitting a video signal is arranged in parallel on the substrate 12.

Each plasma channel 35 of the substrate 33 and each transparent electrode 38 of the substrate 12 cross each other. A display region is formed in each crossed portion. These display regions match with the display regions 14 of the color filter 11. Each plasma channel 35 is successively selected to be turned on, and a voltage is applied to each transparent electrode 38 every time each plasma channel 35 is turned on, whereby the liquid crystal is driven in each display region 14.

In the plasma address type liquid crystal display apparatus as described above, axially symmetric alignment of the liquid crystal molecules is rapidly reproduced in each display region 14. Therefore, a high contrast and outstanding viewing angle characteristics can be exhibited.

As described above, in the color filter according to the present invention, the height of each bar in the row direction of the black mask is different from the height of each bar in the column direction. If the color filter is interposed between the substrates of a liquid crystal display apparatus, the gap between the substrates is determined by the thickest portion of the color filter (i.e., either the height of each bar in the row direction of the black mask or the height of each bar in the column direction of the black mask, whichever is larger). Therefore, spacers such as beads with a small diameter which prevent the alignment of the liquid crystal molecules in each display region from being disturbed are not required.

Furthermore, liquid crystal flows over each lower bar (i.e., liquid crystal flows in a direction orthogonal to each lower bar), so that liquid crystal can be easily injected between the substrates.

Furthermore, if a homeotropic alignment film is provided on each surface of a vertical wall of the black mask of the color filter, liquid crystal molecules are aligned so as to be axially symmetric in each display region, and the alignment of the liquid crystal molecules in each display region is not disturbed as described above. Therefore, a liquid crystal display apparatus with a high contrast and outstanding viewing angle characteristics can be obtained.

In a case where a homeotropic alignment film is provided on a surface of each vertical wall of the black mask, liquid crystal molecules in the liquid crystal layer are aligned in a vertical direction to the substrates when a voltage is not applied from each substrate to each display region, and liquid crystal molecules in the liquid crystal layer are aligned so as to be axially symmetric when a voltage is applied from each substrate to each display region.

Examples of a liquid crystal display apparatus to which the color filter as described above is applicable include an active matrix type liquid crystal display apparatus and a plasma address type liquid crystal display apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A color filter in a liquid crystal display comprising a lattice-shaped black mask having beams in row and column directions on a substrate, a coloring layer being disposed in each display region defined by the lattice-shaped black mask, wherein a height of each beam in the row direction of the black mask is different from a height of each beam in the column direction.

2. A liquid crystal display apparatus, comprising a liquid crystal layer interposed between a pair of substrates, the liquid crystal layer being partitioned into a plurality of display regions, an image being displayed in each of the display regions by applying a voltage from each of the substrates to the display region, wherein a color filter is formed on one of the substrates so as to be interposed between the substrates and the color filter further comprises a lattice-shaped black mask having beams in row and column directions on a substrate, a coloring layer being disposed in each display region defined by the lattice-shaped black mask, wherein a height of each beam in the row direction of the black mask is different from a height of each beam in the column direction.

3. A liquid crystal display apparatus according to claim 2, wherein a homeotropic alignment film is provided on a surface of the black mask of the color filter.

4. A liquid crystal display apparatus according to claim 3, wherein liquid crystal molecules in the liquid crystal layer are aligned in a vertical direction to the substrates while a voltage is not being applied from each of the substrates to the display region, and the liquid crystal molecules in the liquid crystal layer are aligned so as to be axially symmetric while a voltage is being applied from each of the substrates to the display region.

5. A liquid crystal display apparatus according to claim 2, wherein signal electrodes and scanning electrodes are provided on one of the substrates so as to cross each other, each switching element is placed at each crossing portion of the signal electrodes and the scanning electrodes, each display region is defined by the signal electrodes and the scanning electrodes, each pixel electrode is provided in each of the display regions, and each of the pixel electrodes is driven by each of the switching elements.

6. A liquid crystal display apparatus according to claim 2, further comprising a plurality of groove-shaped plasma channels provided on one of the substrates and a plurality of band-shaped signal electrodes provided on the other of the substrates, the substrates are placed with a liquid crystal layer interposed therebetween in such a manner that the plasma channels and the signal electrodes cross each other, and each plasma channel is selectively discharged and each signal is applied to each of the signal electrodes, whereby each voltage is applied to each of the display regions at crossing portions of the plasma channels and the signal electrodes.

7. A color filter according to claim 1, wherein an inside of each display region defined by the lattice-shaped black mask has a mortar shape.

* * * * *